United States Patent
Padmanabhan

(10) Patent No.: US 10,901,974 B2
(45) Date of Patent: Jan. 26, 2021

(54) HYBRID CLOUD CHAIN MANAGEMENT OF CENTRALIZED AND DECENTRALIZED DATA

(71) Applicant: salesforce.com, inc., San Francisco, CA (US)

(72) Inventor: Prithvi Krishnan Padmanabhan, San Ramon, CA (US)

(73) Assignee: salesforce.com, inc., San Francisco, CA (US)

( * ) Notice: Subject to any disclaimer, the term of this patent is extended or adjusted under 35 U.S.C. 154(b) by 258 days.

(21) Appl. No.: 15/940,665

(22) Filed: Mar. 29, 2018

(65) Prior Publication Data

US 2019/0303445 A1    Oct. 3, 2019

(51) Int. Cl.
| | | |
|---|---|---|
| *G06F 16/23* | (2019.01) | |
| *G06F 16/27* | (2019.01) | |
| *H04L 9/00* | (2006.01) | |
| *G06F 16/25* | (2019.01) | |
| *H04L 9/06* | (2006.01) | |

(52) U.S. Cl.
CPC .......... *G06F 16/23* (2019.01); *G06F 16/2365* (2019.01); *G06F 16/256* (2019.01); *G06F 16/27* (2019.01); *H04L 9/006* (2013.01); *H04L 9/0637* (2013.01); *H04L 2209/38* (2013.01)

(58) Field of Classification Search
CPC .... G06F 16/23; G06F 16/256; G06F 16/2365; G06F 16/27; G06F 16/2379; H04L 9/0637; H04L 9/006; H04L 2209/38
USPC ........................................................ 707/609
See application file for complete search history.

(56) References Cited

U.S. PATENT DOCUMENTS

| | | | |
|---|---|---|---|
| 5,634,053 A | 5/1997 | Noble | |
| 2002/0077998 A1* | 6/2002 | Andrews | G06Q 30/02 707/999.001 |
| 2017/0005804 A1* | 1/2017 | Zinder | H04L 63/123 |
| 2017/0046526 A1* | 2/2017 | Chan | G06Q 30/0214 |
| 2017/0046638 A1* | 2/2017 | Chan | G06Q 10/0631 |
| 2017/0046693 A1* | 2/2017 | Haldenby | G06Q 40/08 |
| 2017/0103167 A1* | 4/2017 | Shah | G06Q 50/22 |
| 2017/0221052 A1* | 8/2017 | Sheng | G06Q 20/3829 |

(Continued)

OTHER PUBLICATIONS

McConaghy, Trent et al., "BigchainDC. A Scalable Blockchain Database," available at https://mycources.aalto.fi/pluginfile.php/378362/mod_resource/content/1/bigchaindb-whitepaper.pdf, Nov. 1, 2017.

(Continued)

*Primary Examiner* — Phong H Nguyen

(74) *Attorney, Agent, or Firm* — Sterne, Kessler, Goldstein & Fox P.L.L.C.

(57) ABSTRACT

Disclosed herein are system, method, and computer program product embodiments for a hybrid data management system. An embodiment operates by receiving, from a user interface, a modification to a field of data. It is determined that the field of data corresponds to a decentralized data management system based on a look-up to a metadata repository. The modification is transmitted to the decentralized data management system. From the decentralized data management system, an asset identifier corresponding to the modification is received. The asset identifier is stored in a centralized database. Via the user interface, an indication that the field of data has been modified is provided.

17 Claims, 4 Drawing Sheets

(56) References Cited

U.S. PATENT DOCUMENTS

2017/0324711 A1* 11/2017 Feeney ................ H04L 9/3247
2017/0364549 A1    12/2017 Abalos
2019/0014176 A1*  1/2019 Tormasov ........... H04L 41/5019
2019/0213333 A1*  7/2019 Williams ............... G06F 21/64

OTHER PUBLICATIONS

"Federate database system—Wikipedia," available at https://en.wikipedia.org/w/index.php/?title=Federated%20database%20system&oldid=808166410, Jun. 8, 2016.

* cited by examiner

HYBRID CLOUD CHAIN MANAGEMENT OF CENTRALIZED AND DECENTRALIZED DATA

CROSS REFERENCE TO RELATED APPLICATIONS

This application is related to co-pending U.S. Pat. No. 10,585,657, by Padmanabhan, "Setup, Management, and Packaging of Applications Accessing Centralized and Decentralized Data," filed herewith; and is also related to co-pending U.S. patent application Ser. No. 15/885,811, by Padmanabhan, "Systems, Methods, and Apparatuses for Implementing Document Interface and Collaboration Using Quipchain In a Cloud Based Computing Environment," filed Jan. 31, 2018, U.S. patent application Ser. No. 15/885,803, by Padmanabhan, "Systems, Methods, and Apparatuses for Implementing Intelligent Consensus, Smart Consensus, and Weighted Consensus Models for Distributed Ledger Technologies in a Cloud Based Computing Environment," filed Jan. 31, 2018, U.S. patent application Ser. No. 15/932,100, by Padmanabhan, "Systems, Methods, and Apparatuses for Implementing Super Community And Community Sidechains with Consent Management for Distributed Ledger Technologies in a Cloud Based Computing Environment" filed Jan. 31, 2018, U.S. patent application Ser. No. 15/932,099, by Padmanabhan, "Systems, Methods, and Apparatuses for Implementing a Virtual Chain Model for Distributed Ledger Technologies in a Cloud Based Computing Environment" filed Jan. 31, 2018, and U.S. patent application Ser. No. 15/932,092, by Padmanabhan, "Systems, Methods, and Apparatuses for Implementing Smart Flow Contracts Using Distributed Ledger Technologies in a Cloud Based Computing Environment" filed Jan. 31, 2018; all of which are hereby incorporated by reference in their entireties.

BACKGROUND

With the rise of blockchain technology as a data management system, data may be stored in either a traditional or centralized manner on a database, or in distributed or decentralized manner across a blockchain. However, managing the data when it may be stored in different management systems becomes a problematic and resource intensive task as each data management system has its own processes for how data may be accessed and modified.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for the management of centralized and decentralized data.

Figure 1:
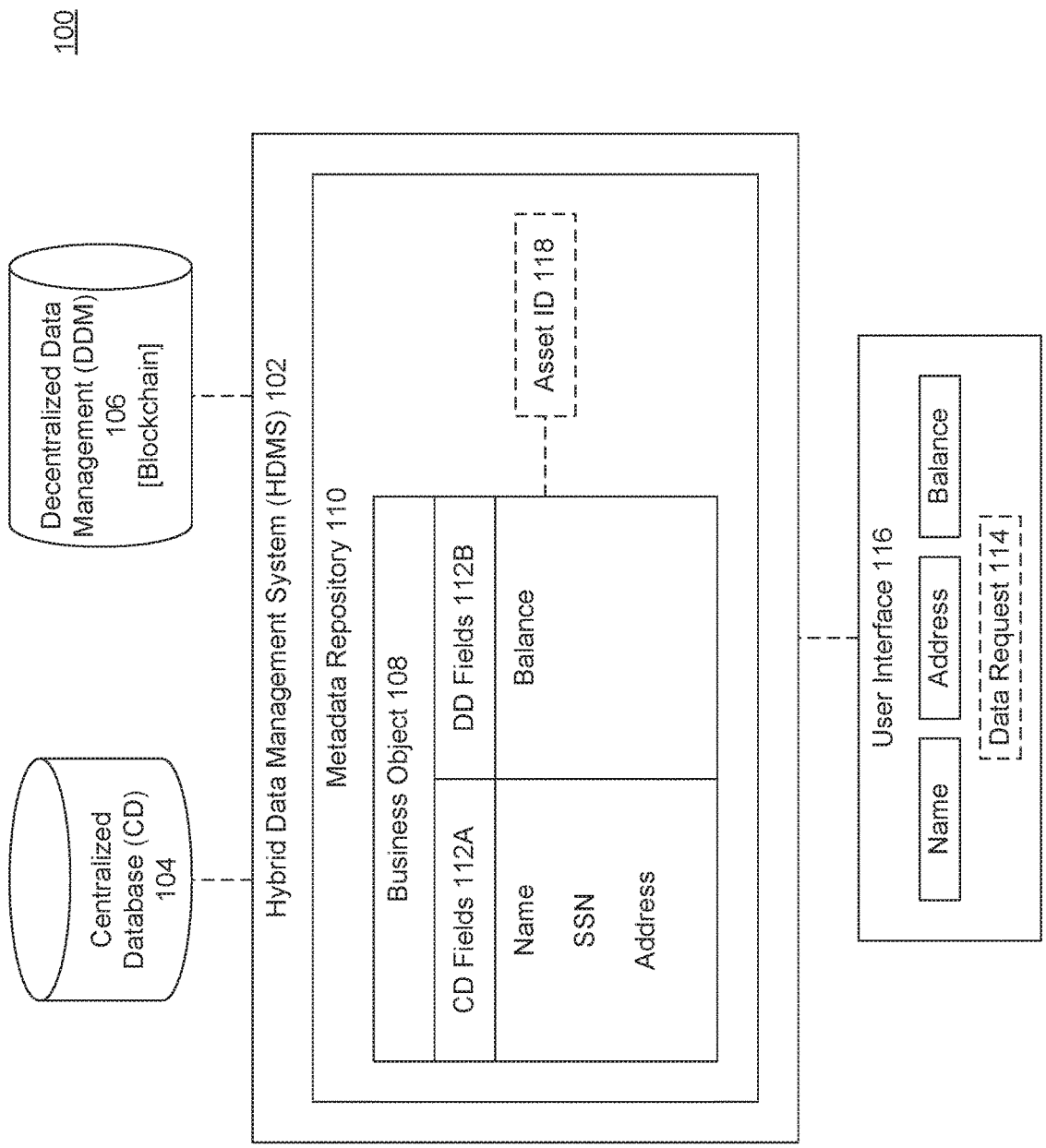
FIG. 1 is a block diagram illustrating an example hybrid data management system (HDMS), according to some embodiments.

FIG. 1 is a block diagram 100 illustrating an example hybrid data management system (HDMS) 102, according to some embodiments. Data may be stored and accessed from various data management systems, including both a centralized database (CD) 104 and a decentralized data management (DDM) 106.

CD 104 may include a system of one or computing devices or servers that manage data in a row wise or column wise database format. CD 104 may include a master repository of data which may be accessed or changed by various computing devices which have access to CD 104. For example, an enterprise server may host a master set of data that is accessed and modified by a number of computing devices. Then, for example, the computing devices may either synchronously or asynchronously perform updates to the master data set.

In an embodiment, CD 104 may include a conflict resolution mechanism that resolves any conflicts that may occur when two or more devices try and modify the same data during the same time interval. In an embodiment, CD 104 may include a multi-versioning database that hosts multiple versions of data based on various transactions which may be accessing various records of CD 104.

DDM 106 may be a system of multiple computing devices arranged in a peer-to-peer network that together maintain a distributed ledger of transactions between the users, systems, or devices that are part of the DDM 106 network. An example DDM 106 may include a blockchain. In a blockchain, a ledger of transactions may be maintained in a growing list of records, referred to as blocks. In an embodiment, each block may include a hash pointer to a previous block, a timestamp, and transactional data. This growing list of blocks and pointers may be the chain of blocks referred to as the blockchain. As used herein, the terms blockchain and DDM 106 may be used interchangeably.

In an embodiment, once data of a transaction is recorded on DDM 106, the data cannot be altered afterwards without altering all of the subsequent blocks, without a collusion of a majority of the network, which helps to prevent fraud. In an embodiment, DDM 106 may be used to store various types of data including, but not limited to, event data, transaction data occurring between parties (particularly that are members of the blockchain), and medical records. DDM 106 may also be used to manage or track digital currencies, such as bitcoin.

In an embodiment, the data of DDM 106 may be distributed multiple times across the networks of machines or systems participating in the DDM 106. Information stored across the participating nodes may continually or periodically be reconciled or otherwise asynchronously updated. Unlike CD 104, the data of DDM 106 is not stored in any single location, but instead is decentralized, distributed, or shared amongst the member devices of the chain or information network.

For example, identical blocks of data may be stored across all or a subset of the network of computers of DDM 106. This may enable multiple parties or devices to have access to the same (master) data at the same time, and the data is not under the control of any one single entity and does not have any single point of failure. In an embodiment, every or selects nodes or devices of DDM 106 may function as an administrator of all or a portion of the data of DDM 106. This may be different from CD 104 in which the nodes that are updating the data must synchronize with a master copy of the data for the update to be committed. Additional differences and distinctions between centralized database 104 and DDM 106 are discussed below in reference to FIG. 3. Though as described herein, DDM 106 is primary referred to in context of being a decentralized ledger, in another embodiment, DDM 106 may include one or more decentralized databases.

In an embodiment, HDMS 102 may manage data stored across both CD 104 and DDM 106 as business objects 108. Business object 108 may include a grouping or collection of fields, rows, or columns that are related to a particular concept or idea. Example business objects 108 may include customers, employees, accounts, branches, partners, vehicles, products, and suppliers. In an embodiment, one or more applications or programs (for example, operating on a cloud platform) may access or organize data as various business objects 108 which are managed by HDMS 102 in the manner described herein.

Each business object 108 may include various (one or more) fields of data or information relevant to that particular object. The example customer business object shown may include fields such as Name, SSN (social security number), address, and account balance. In other embodiments, the customer business object may include different or varying fields, other than those shown, such as phone number, how long they have been a customer, family information, medical information, nationality, residency, order history, payment history, etc.

In an embodiment, HDMS 102 may maintain a metadata repository 110 or other mapping that is used to store information about the fields 112 of the various business objects 108 being used or accessed across one or more applications. Example information that may mapped or tracked by metadata repository 110 include the field, the field type, a key type, and a location of the field.

In an embodiment, the information of metadata repository 110 may be used to separate or categorize the fields 112 of the various business objects 108 based on where (i.e., location) or how the underlying data is stored or managed. For example, metadata repository 110 may track or indicate whether the fields 112 are CD fields 112A managed by CD 104 or DD fields 112B managed by DDM 106. In another embodiment, in which multiple CDs 104 or DDM 106 may store or manage data, user interface 116 may display fields from across the CDs 104 and DDs 106 and metadata repository 110 may map the fields 112 to the particular CD 104 or by which particular DDM 106 is being managed. The mapping may include identifier, table, row, column, memory block, or other location information.

By identifying whether the data is being managed by CD 104 or DDM 106, HDMS 102 may identify, retrieve, or execute the corresponding processes for accessing or modifying the data, as may be indicated by a data request 114. In an embodiment, HDMS 102 may receive a data request 114 to perform a data function such as reading or modifying data, from a user interface 116.

Rather than executing a first application to access or modify data from CD 104 and a second application to access or modify data from DDM 106, user interface 116 may include, display, or enable information from the various CDs 104 and/or DDs 106 to be modified from one unified interface or display screen. User interface 116 may be an application, app, program or other system that a user or to submit a data request 114 to access or modify the data regardless of whether the data is stored on either CD 104 or DDM 106.

In an embodiment, HDMS 102 may provide or make available user interface 116 accessible from a user device. User interface 116 may then be used to access or modify the data across one or more applications for which HDMS 102 is providing the data access and management functionality described herein. HDMS 102 may abstract the data access and modification processes of CD 104 and DDM 106 from the user or system which may be making the request 114, thus simplifying data management tasks.

In an embodiment, as part of this abstraction process, an application programming interface (API) may enable user interface 116 to communicate data requests 114 from a user or other system to HDMS 102. An application developer may reference this API to configure an application-specific user interface 116 from which a user or system may access data stored on both or either CD 104 and DDM 106. From the user interface 116, a user or system may submit one or more data requests 114.

Data request 114 may include a data processing request that identifies one or more data fields 112 associated with the requested functionality. Example data processing requests may be to add, remove, update, read or otherwise access data. In the example of FIG. 1, user interface 116 may display the fields: name, address, and balance. Then, for example, data request 114 may indicate a request to update the balance. The balance update may include a new value for balance, or identify a debit or credit transaction that is to be added to the existing balance.

Another example request 114 may include a request for the SSN. In an embodiment, HDMS 102 may verify that a particular user account or device associated with the request is authorized to conduct the transaction, or access/modify the indicated data fields. For example, HDMS 102 may deny a request to access the SSN of a customer record if the user account associated with the data request 114 does not have the authorization or permissions necessary to access the SSN data. In another embodiment, the user account may have read authorization for particular data (such as balance information) but may not have write authorization to modify the data values.

Upon receiving an authorized data request 114, HDMS 102 may identify which field(s) of data are associated with the request. By using, receiving, or requesting information form metadata repository 110, HDMS 102 may identify where the data is located and how the data is being managed (i.e., either by CD 104 or DDM 106). HDMS 102 may then execute the corresponding or requested functionality.

For example, if data request 114 indicates that balance should be increased by $100 or changed to $3200 (from $3100), then HDMS 102 may determine that balance is a DD field 112B. HDMS 102 may then execute the data modification process for DDM 106 that increases balance by $100. Or, for example, if data request 114 indicated that name is to be updated, HDMS 102 may determine that name is a CD field 112A and perform the indicated update operation on CD 104.

In an embodiment, during a set-up or configuration of an application, HDMS 102 may have been previously configured with the details on how to perform data reads, adds, deletions, and updates for each of CD 104 and DDM 106. In an embodiment, this information may be stored within metadata repository 110 or otherwise be accessible to HDMS 102 from another storage location or system.

User interface 116 or the underlying application may not distinguish between fields that are being managed by CD 104 or DDM 106. From the user interface 116 point-of-view, data is the same regardless of whether is managed in a centralized or decentralized fashion. In an embodiment, HDMS 102 may receive, from user interface 116, an update, add, delete, or read request 114 in the same manner regardless of whether the underlying data (field) is being managed on CD 104 or DDM 106. The management details may be abstracted from the user interface 116 and/or an underlying application which may communicate requests via an application programming interface (API).

Upon receiving the request 114, HDMS 102 may identify whether the data associated with the request corresponds to CD fields 112A and/or DD fields 112B. Based on this determination, HDMS 102 may determine how to interpret, translate or execute the request 114. For example, data requests 114 may be received as SQL queries or requests. However while CD 104 may be able to execute SQL queries, DDM 106 may not be able to execute or process SQL queries. Upon receiving a data request 114, if HDMS 102 determines that the data of the request 114 corresponds to a CD field 112A, the SQL query may be directly executed against CD 104 without any additional processing.

However, if HDMS 102 determines that the data of the request 114 corresponds to a DD field 112B, then HDMS 102 may translate or covert the request so that it is executable against DDM 106. Receiving a data request 114 that is executable against at least one of DDM 106 or CD 104 may enable HDMS 102 to save processing resources and speed up execution when it is determined that the data request 114 does not have to be converted or translated (e.g., for execution against CD 104). In another embodiment, if most data requests 114 are against DDM 106, then data requests 114 may be received as default executable against DDM 106 and may be converted when CD fields 112A are identified.

HDMS 102 may enable a user or other interfacing system to query CD fields 112A and DD fields 112B using a single query or single query format. For example, HDMS 102 may receive data request 114 which may include both a name and balance lookup or modification. HDMS 102 may then translate the data request 114 into one or more SQL or other query languages that may be necessary to retrieve, query, or modify the data of the CD fields 112A.

HDMS 102 may also translate the data request 114 into one or more instructions (e.g., application programming interface (API) calls) that may be necessary to retrieve, query, or modify the data of the DD fields 112B. In an embodiment, accessing CD 104 or DDM 106 may require username, passwords, private key, public key, and/or other authentication or user information. In such embodiments, HDMS 102 may retrieve or request the required information as part of the translation process.

In an embodiment, if data has been retrieved from CD 104 or DDM 106, HDMS 102 may further translate or otherwise reformat the data so that it may be displayed or otherwise understood by a requesting user or system. By providing underlying translation processes, HDMS 102 may enable different applications to provide a visual display or query format that is unified across different applications or otherwise independent of the underlying data management systems being accessed (e.g., CD 104 and DDM 106).

As shown in the example of FIG. 1, balance may be a DD field 112B while name and address may be CD fields 112A, but all three fields may be displayed within the same application or user interface 116 despite being retrieved from or managed by different sources. Upon receiving data request 114, and determining whether the field is a CD field 112A or DD field 112B, HDMS 102 may then execute the corresponding functionality for fulfilling the request 114. In an embodiment, HDMS 102 determine which customer record is associated with the field, or this information may be received as part of request 114. For example, CD 104 may include information for thousands or millions of different customer records.

If the fields of an update data request 114 are CD fields 112A, then HDMS 102 may execute the request against CD 104 or otherwise submit the request to be executed by CD 104. In an embodiment, HDMS 102 may retrieve user account information necessary to execute the request 114 against CD 104 on behalf of the requesting user. In an embodiment, this information may include user identification and password information. The execution of data request 114 may include a synchronous or asynchronous update to the master data of CD 104. In an embodiment, HDMS 102 may receive an indication that whether the request has been successfully completed by CD 104.

If data request 114 is associated with a DD field 112B, then HDMS 102 may execute or submit the request to be executed by DDM 106. As noted above, in an embodiment, the request 114 may be converted into a set of one or more DDM 106 commands, requests, or instructions. After receiving or retrieving the corresponding user or system access information necessary for requesting updates to a ledger or DDM 106, the update request may be submitted to DDM 106 for execution.

In an embodiment, the system or user access information for DDM 106 may include private key and public key information that is submitted to or otherwise used to access and update the information of the ledger of DDM 106. For example, a user identifier of a user requesting data request 114 may be identified. The user identifier may be associated with its own private key information for making updates to DDM 106. The combination of private and public key information may be used to generate a signature for the requested transaction, and may be used to confirm (by DDM 106) that the transaction has come from a verified user. The signature may also be used to prevent the transaction from being altered once it has been issued.

In an embodiment, each transaction submitted or reconciled into the ledger of DDM 106 may be assigned or associated with a asset identifier (ID) 118. For example, if balance is increased due to a funds transfer, then asset ID 118 may reference a transaction in DDM 106 or other entry in which the new balance is provided. Or, for example, asset ID 118 may indicate a storage location (within a ledger of DDM 106) of the value of the balance information for a particular customer record or account.

In an embodiment, if a transaction or request 114 is rejected, not reconciled, or otherwise not included on the ledger of DDM 106, HDMS 102 may signal this result to a user via the user interface 116. The value of the requested data field (e.g., balance) would not be updated. DDM 106 may reject a transaction for any number of reasons, including for example, the private key may have been incorrect. However, even upon a rejected transaction, asset ID 118 may still refer to the proper balance information as maintained by DDM 106.

In an embodiment, HDMS 102 may store the asset ID 118 as part of business object 108 which may be stored on CD 104. Rather than storing the actual account balance information (which may be maintained by DDM 106), CD 104 may include asset ID 118 may reference the most recent balance information from DDM 106. Then, for example, when the actual balance information is requested, HDMS 102 may use asset ID 118 to look-up the balance data from DDM 106 and return that information to CD 104 or user interface 116. Storing asset ID 118 may enable HDMS 102 to perform faster lookups for values of the corresponding DD data field 112B (e.g., balance) than if the asset ID 118 was not maintained or stored.

Figure 2:
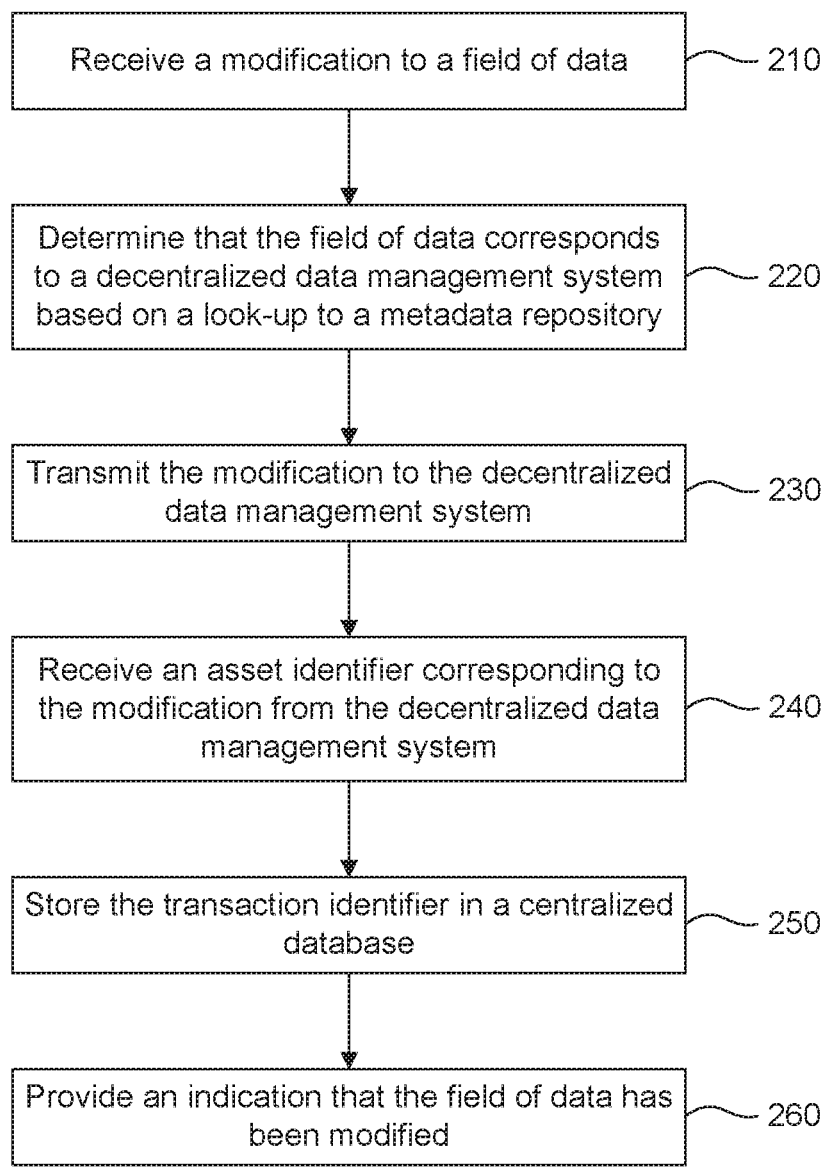
FIG. 2 is a flowchart illustrating example operations of an example hybrid data management system (HDMS), according to some embodiments.

FIG. 2 a flowchart 200 illustrating example operations a hybrid data management system 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, a modification to a field of data is received. For example, HDMS 102 may receive data request 114. Data request 114 may include a request to add, delete, or otherwise modify or update data of one or more fields 112 of a business object 108.

In 220, it is determined that the field of data corresponds to a decentralized data management system based on a look-up to a metadata repository. For example, HDMS 102 may determine whether the field(s) of data request 114 are managed by CD 104 or DDM 106 based on a look-up to metadata repository 110. In an embodiment, HDMS 102 may receive metadata repository 110 as part of an application (associated with user interface 116) that is being used to access data. For example, metadata repository 110 may include a text, extensible markup language (XML), spreadsheet, or other file that indicates whether different fields are CD fields 112A or DD fields 112B.

In 230, the modification is transmitted to the decentralized data management system. For example, based on the metadata repository 110 look-up, HDMS 102 may determine that balance is a DD field 112B. In an embodiment, HDMS 102 may translate the data request 114 (which may be received as an SQL or other instruction executable against CD 104) into one more instructions or processes for accessing or requesting an update to the data of DDM 106. In another embodiment, request 114 may be directly executable against DD 106.

HDMS 102 may include, request, or be configured with authorization or access information necessary to locate and access/request data updates to DDM 106 and CD 104. DDM 106 access information may include private and public key information corresponding to a user or user device from which data request 114 was received.

In 240, a transaction identifier corresponding to the modification is received from the decentralized data management system. For example, when DDM 106 receives, processes, or reconciles the transaction submitted or provided by HDMS 102 for updating data, DDM 106 may assign or generate an asset ID 118 corresponding to the submitted request. In an embodiment, asset ID 118 may indicate that the modification was accepted by the decentralized database, or be a link or pointer to the most recent balance or other information from the ledger of DDM 106.

In 250, the asset identifier is stored in a centralized database. For example, business object 108 may be stored in centralized database 104. However, as balance information may be managed by DDM 106, asset ID 118 (corresponding to balance) may be stored in CD 104. Then, for example, when a balance update or read request is received, HDMS 102 may use asset ID 118 to quickly look up or determine the current value of balance from the ledger of DDM 106. Asset ID 118 may include an indication or a memory or entry location, an identification of a particular block, or other location identifier of the value of the corresponding data or information in the ledger.

In 260, an indication that the field of data has been modified is provided. For example, HDMS 102 may return a visual or other indication that the data request 114 has been fulfilled. In another embodiment, HDSM 102 may also return an indication if the request 114 fails to complete at any point in the processing.

Figure 3:
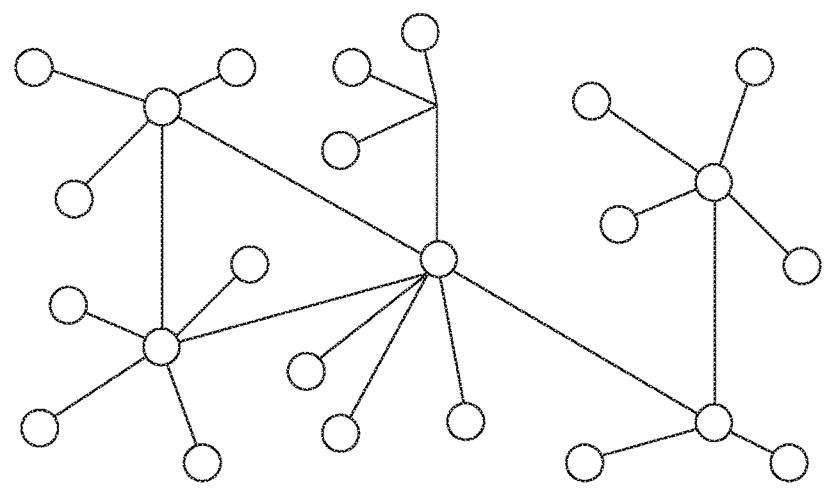
FIG. 3 illustrates differences between a centralized database system and a decentralized database system, according to some embodiments.
Figure 3:
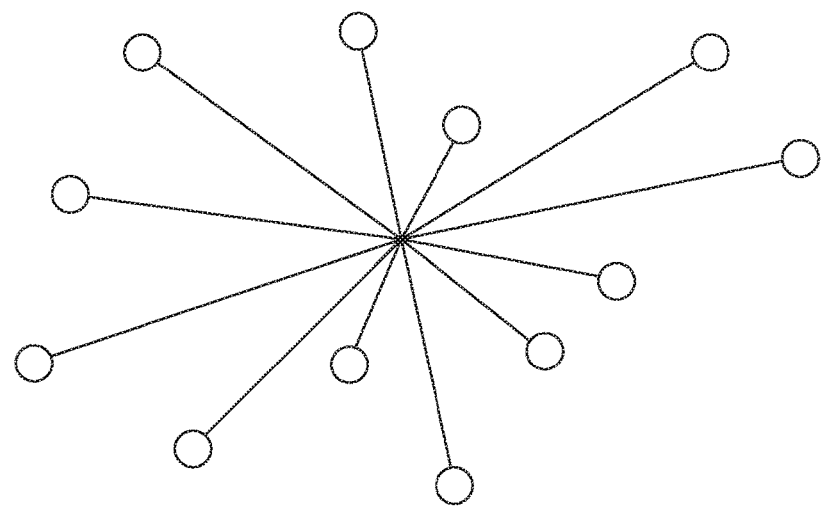

FIG. 3 illustrates differences between a centralized database system 310 and a decentralized database system 330, according to some embodiments.

In the example of FIG. 3, information network 310 may illustrate an example architecture of CD 104. As illustrated by information network 310, a central or coordinating point or node may manage the information or data which may be distributed across to accessible to various other nodes. For example, an enterprise database may maintain a master set of data that is being accessed and modified by various other computing devices over mobile phones and laptops. This master data set may be synchronously or asynchronously updated by the nodes modifying the data.

Decentralized information network 330 may illustrate an example architecture for DDM 106. In contrast to network 310, network 330 does not include a single or centralized point of failure or a master set of data. Instead, each node may include a (full or partial) copy of a ledger and may participate in confirming or reconciling transactions asynchronously or independently (i.e., without requesting that a core or master set of data is updated). Once an update to the ledger is reconciled by all or otherwise indicated number of the participating network nodes of network 330, the data change or update may be deemed committed or complete.

Figure 4:
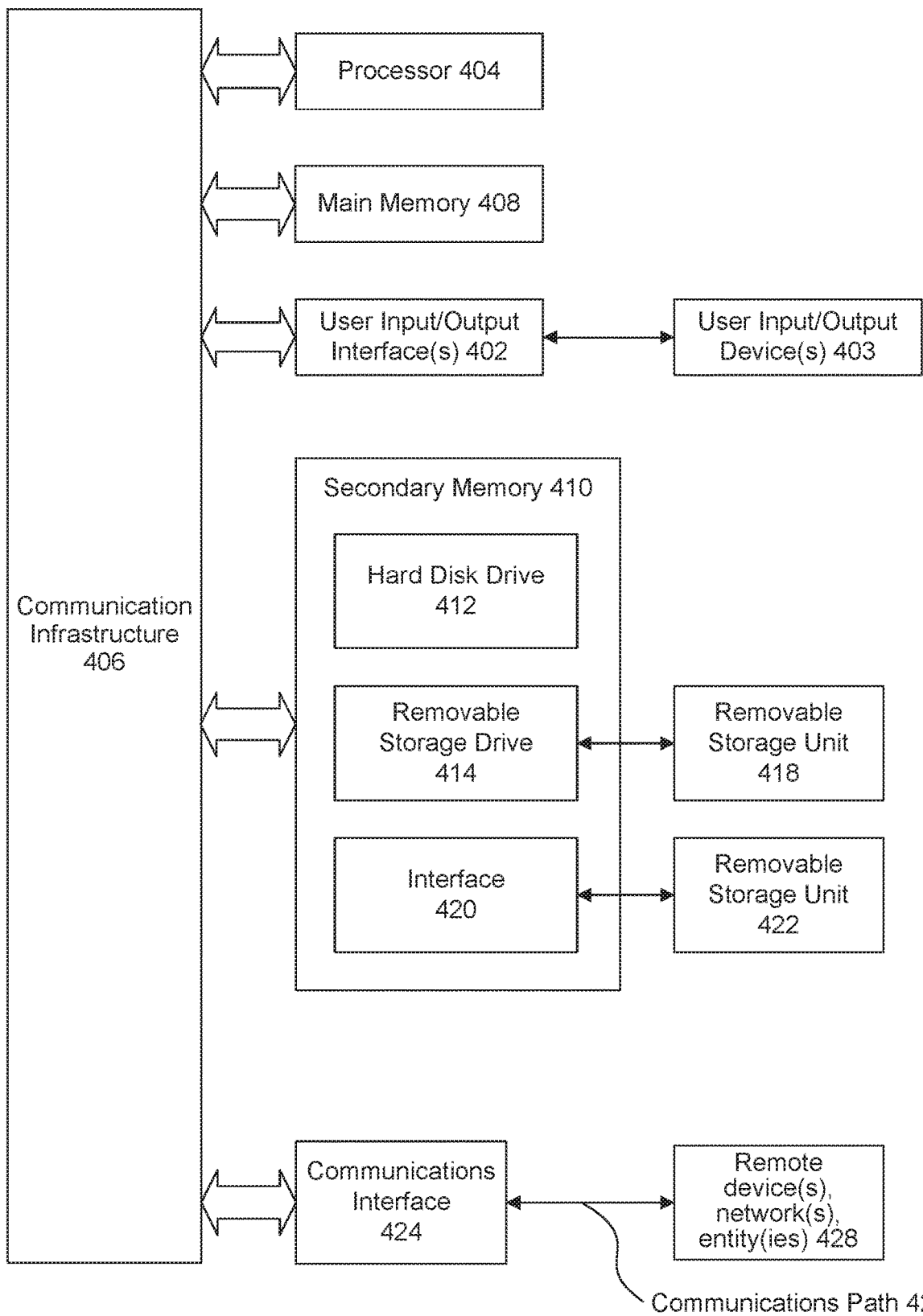
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions), "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving a request to display a plurality of fields of a customer record in a user interface, wherein a first field of the plurality of fields of data is maintained by a decentralized data management system and a second field of the plurality of fields of data is maintained by a centralized database;
   performing a look-up to a metadata repository for each of plurality of fields, wherein the metadata repository indicates whether data for a corresponding field is to be retrieved from the decentralized data management system or the centralized database;
   retrieving the data for the each of the plurality of fields from both the decentralized data management system and the centralized database based on the lookup;
   receiving, from the user interface, a modification to a field;
   determining the customer record associated with the field associated with the modification;
   determining that the field associated with the modification corresponds to the decentralized data management system based on the look-up to the metadata repository;
   providing the modification to the decentralized data management system;
   receiving, from the decentralized data management system, an asset identifier corresponding to the modification, wherein the asset identifier indicates that the modification was accepted by the decentralized data management system and a ledger of the decentralized data management system was updated;
   storing the asset identifier in the centralized database as part of the customer record; and
   providing, via the user interface, an indication that the field of data has been modified.

2. The method of claim 1, wherein the storing comprises:
   identifying the plurality of fields associated with the customer record in the centralized database; and
   storing the asset identifier in one of the plurality of fields of the centralized database.

3. The method of claim 2, wherein the user interface displays one or more of the plurality of fields associated with the customer record that are stored in the centralized database.

4. The method of claim 1, wherein the transmitting comprises:
   determining a user identifier requesting the modification; and
   retrieving a private key and a public key, corresponding to the user identifier, for accessing the decentralized data management system.

5. The method of claim 4, wherein the ledger comprises a blockchain ledger.

6. The method of claim 1, wherein the determining comprises:
   determining to which one of a plurality of decentralized data management systems the field corresponds, wherein the user interface displays at least one field from each of the plurality of decentralized data management systems.

7. The computer-implemented method of claim 1, wherein the providing comprises:
   translating the modification from a structured query language (SQL) request into a request executable against the decentralized data management system.

8. A system, comprising:
   a memory; and
   at least one processor coupled to the memory and configured to:
   receive a request to display a plurality of fields of a customer record in a user interface, wherein a first field of the plurality of fields of data is maintained by a decentralized data management system and a second field of the plurality of fields of data is maintained by a centralized database;
   perform a look-up to a metadata repository for each of plurality of fields, wherein the metadata repository indicates whether data for a corresponding field is to be retrieved from the decentralized data management system or the centralized database;
   retrieve the data for the each of the plurality of fields from both the decentralized data management system and the centralized database based on the lookup;
   receive, from the user interface, a modification to a field;
   determine the customer record associated with the field associated with the modification;
   determine that the field associated with the modification corresponds to the decentralized data management system based on the look-up to the metadata repository;
   provide the modification to the decentralized data management system;
   receive, from the decentralized data management system, an asset identifier corresponding to the modification, wherein the asset identifier indicates that the modification was accepted by the decentralized data management system and a ledger of the decentralized data management system was updated;
   store the asset identifier in the centralized database as part of the customer record; and
   provide, via the user interface, an indication that the field of data has been modified.

9. The system of claim 8, wherein the processor that stores is configured to:
   identify the plurality of fields associated with the customer record in the centralized database; and
   store the transaction identifier in one of the plurality of fields of the centralized database.

10. The system of claim 9, wherein the message is received from another processor.

11. The system of claim 10, wherein the user interface displays one or more of the plurality of fields associated with the customer record that are stored in the centralized database.

12. The system of claim 8, wherein the processor that transmits is configured to:
    determine a user identifier requesting the modification; and
    retrieve a private key and a public key, corresponding to the user identifier, for accessing the decentralized data management system.

13. The system of claim 12, wherein the ledger comprises a blockchain ledger.

14. The system of claim 8, wherein the processor that determines is configured to:
   determine to which one of a plurality of decentralized data management systems the field corresponds, wherein the user interface displays at least one field from each of the plurality of decentralized data management systems.

15. A non-transitory computer-readable device having instructions stored thereon that, when executed by at least one computing device, cause the at least one computing device to perform operations comprising:
   receiving a request to display a plurality of fields of a customer record in a user interface, wherein a first field of the plurality of fields of data is maintained by a decentralized data management system and a second field of the plurality of fields of data is maintained by a centralized database;
   performing a look-up to a metadata repository for each of plurality of fields, wherein the metadata repository indicates whether data for a corresponding field is to be retrieved from the decentralized data management system or the centralized database;
   retrieving the data for the each of the plurality of fields from both the decentralized data management system and the centralized database based on the lookup;
   receiving, from the user interface, a modification to a field;
   determining the customer record associated with the field associated with the modification;
   determining that the field associated with the modification corresponds to the decentralized data management system based on the look-up to the metadata repository;
   providing the modification to the decentralized data management system;
   receiving, from the decentralized data management system, an asset identifier corresponding to the modification, wherein the asset identifier indicates that the modification was accepted by the decentralized data management system and a ledger of the decentralized data management system was updated;
   storing the asset identifier in the centralized database as part of the customer record; and
   providing, via the user interface, an indication that the field of data has been modified.

16. The non-transitory computer-readable device of claim 15, wherein the storing comprises:
   identifying the plurality of fields associated with the customer record in the centralized database; and
   storing the transaction identifier in one of the plurality of fields of the centralized database.

17. The non-transitory computer-readable device of claim 15, wherein the user interface displays one or more of the plurality of fields associated with the customer record that are stored in the centralized database.

* * * * *